Patented June 15, 1937

2,084,039

UNITED STATES PATENT OFFICE 2,084,039

COOKED VARNISHES

John A. Lutz, Akron, Ohio, assignor to Wingfoot Corporation, Wilmington, Del., a corporation of Delaware No Drawing. Application September 19, 1935, Serial No. 41,293

1 Claim. (Cl. 134—17)

This invention relates to cooked varnishes. A cooked varnish is a coating composition prepared by heating a resin in an oil such as China-wood oil or linseed oil until the oil has the proper body to be used for a varnish. Cooked varnishes have been recognized in the art as being particularly desirable for special uses such as where the coating is to be subjected to severe weathering.

The cooked varnishes of this invention are made from oxidized condensation derivatives of rubber. These condensation derivatives of rubber may be made by treating rubber with chlorostannic acid or with the halide of an amphoteric metal such as tin tetrachloride, chromic chloride, etc. In using the halides of amphoteric metals it is preferable to prepare a rubber cement and then boil the cement before adding the condensing agent. The cement may be treated with hydrochloric acid or some other conversion agent before treating with the condensing agent if desired.

The preferred condensation derivative is obtained by dissolving in benzene 10% by weight of pale crepe rubber which has been plasticized to a condition such that a $\frac{1}{16}$ cubic inch sample when placed on a flat plate beneath a flat 10 kg. weight for 2½ minutes in a cabinet heated to 70° C. (the sample being previously heated to this temperature) is flattened out to a thickness slightly less than ⅛". This corresponds to a plasticity of about 300 as measured by a Williams plastometer.

Three hundred and fifty gallons of the cement so prepared is treated with 10% by weight of chlorostannic acid in a Day mixer equipped with an agitator and reflux condenser and heated and agitated for three hours at 65–80° C. Samples are then taken every few minutes and viscosities determined by suitable means. The reaction is continued until cement of a predetermined viscosity is obtained. In general a reaction period of about six hours will be required although this varies from batch to batch. A satisfactory product may be obtained from cement which has been reacted to a viscosity of about 1–1.2 minutes when measured by a Gardner mobilometer of the following dimensions:

| | |
|---|---|
| Thickness of plunger_____inch__ | 0.066 |
| Diameter of plunger shaft_____do____ | 0.248 |
| Height of cylinder_____do____ | 9.0 |
| Length of plunger shaft_____do____ | 20.0 |
| Total weight of shaft, top weight and disc_____grams__ | 68.6 |
| Diam. of plunger disc_____inch__ | 1.502 |
| Inside diam. of cylinder containing test sample_____inch__ | 1.535 |
| Distance between the two marks on plunger shaft_____inch__ | 7.484 |

This product is an addition product of rubber A and it contains tin and chlorine. The addition product is decomposed by water and a preferable way of doing this is to pour the reacted cement into a large volume of water which contains a reducing agent, for example ¾ ounce of sodium sulfite per gallon of water. This mixture is agitated to maintain an emulsion and steam distilled to remove the solvent. The condensation derivative is thus precipitated in a finely divided form. This product is then dried in a vacuum. A substantially unoxidized product thus prepared under non-oxidizing conditions is preferably oxidized before being used in a cooked varnish. This oxidation may be carried out in an oven or in a rotating drum or other suitable device. Heating accelerates the reaction with oxygen. If the condensation derivative has been prepared under non-oxidizing conditions an increase in weight of 3½ or 4% to 5 or 6 or 9% during oxidation yields a resin very satisfactory for the preparation of cooked varnishes.

Part or all of the oxidation may be obtained during the preparation of the condensation derivative and before the completion of the drying operation. To facilitate this, water without a reducing agent is used in the preparation of the emulsion. The reactor in which the rubber cement is treated with the condensing agent is only partially filled so as to contain a large amount of air. The drying may be conducted under oxidizing conditions, and in this event the drying should be carefully conducted as the oxidation generates heat and with too rapid oxidation charring or burning will result.

If the oxidation is carried out at an elevated temperature, it is desirable to cool the product before storing it as oxidation may continue if the hot material is stored, and the temperature may rise to a point where the product is damaged. If the condensation derivative of rubber is obtained in a substantially unoxidized condition and in a finely divided state by steam distillation of an emulsion of a solution thereof (as above described), and this finely divided product is oxidized by heating in a current of air, the finely divided oxidized product may be milled to reduce its specific surface and thus limit further oxidation. The milled product may be ground to any desirable size for use in the varnish.

A condensation derivative of rubber prepared under non-oxidizing conditions which has a softening point in the neighborhood of 28 to 38° C. and which has subsequently been oxidized so as to increase its weight by 4 or 5% is a very satisfactory resin for the preparation of cooked varnishes. (Throughout the specification and claim softening points are to be determined by the A. S. T. M. method for distortion under heat. A. S. T. M. designation D 48–30.)

The varnish is prepared by cooking the resin in a vegetable oil such as China-wood oil or linseed oil or soya bean oil or a marine oil such as menhaden oil. Driers, colors, etc. may be added as desired.

A varnish may for example be made from:

|  | Parts |
|---|---|
| Raw China-wood oil | 200 |
| Oxidized rubber condensation derivative | 60 |
| Lead-manganese naphthenate drier | 4 |
| Mineral spirits | 180 |

The rubber condensation may be prepared by the method described and preferably has a softening point of 28–30° C.

The China-wood oil is heated to 225 to 275° F. at which point the oxidized rubber condensation derivative is added. The temperature is gradually raised in 20 to 25 minutes to 525 to 575° F. The "cook" is held at this point for a period of 5 to 10 minutes until the desired viscosity is obtained. It is then cooled to 300° F. and the mineral spirits and drier added. The cooling may be more or less rapid, depending upon the viscosity desired. Solid driers may be incorporated in the "down heat" of the cook.

This example is to be considered as illustrative and not as limiting the invention. For example, the softening point and the amount of resin may be varied within a considerable range. Resins which before oxidation have a softening point as low as 20° C. and as high as 50° C. have been used satisfactorily after oxidation. Various pigments may be used for coloring the varnish such as for example titanium oxide and iron oxide. Driers such as lead, cobalt and manganese linoleate may be used. Plasticizers, etc. may be added as desired. Instead of using China-wood oil other vehicles such as linseed oil, soya bean oil, etc. may be employed successfully.

The preparation of oxidized condensation derivatives is disclosed and claimed in copending application Serial 41,292 filed Sept. 19, 1935.

I claim:

A cooked varnish which includes a drying oil and a considerable proportion of an oxidized condensation derivative of rubber which derivative is obtainable by the treatment of rubber with either the halide of an amphoteric element or a chlorostannic acid.

JOHN A. LUTZ.